US012606457B2

(12) United States Patent
Jeong et al.

(10) Patent No.: US 12,606,457 B2
(45) Date of Patent: Apr. 21, 2026

(54) POSITIVE ELECTRODE ACTIVE MATERIAL PRECURSOR FOR SECONDARY BATTERY, POSITIVE ELECTRODE ACTIVE MATERIAL, PREPARATION METHODS THEREOF, AND LITHIUM SECONDARY BATTERY INCLUDING THE POSITIVE ELECTRODE ACTIVE MATERIAL

(71) Applicant: LG Chem, Ltd., Seoul (KR)

(72) Inventors: Jin Hoo Jeong, Daejeon (KR); Sang Won Woo, Daejeon (KR); Jong Hyun Shim, Daejeon (KR); Jin Wook Ju, Daejeon (KR)

(73) Assignee: LG Chem, Ltd., Seoul (KR)

( * ) Notice: Subject to any disclaimer, the term of this patent is extended or adjusted under 35 U.S.C. 154(b) by 643 days.

(21) Appl. No.: 17/773,202

(22) PCT Filed: Jan. 29, 2021

(86) PCT No.: PCT/KR2021/001203
§ 371 (c)(1),
(2) Date: Apr. 29, 2022

(87) PCT Pub. No.: WO2021/154024
PCT Pub. Date: Aug. 5, 2021

(65) Prior Publication Data
US 2022/0411283 A1 Dec. 29, 2022

(30) Foreign Application Priority Data
Jan. 29, 2020 (KR) ........................ 10-2020-0010701

(51) Int. Cl.
| | |
|---|---|
| *H01M 10/05* | (2010.01) |
| *C01G 53/50* | (2025.01) |
| *H01M 10/052* | (2010.01) |

(52) U.S. Cl.
CPC .......... *C01G 53/50* (2013.01); *H01M 10/052* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 9,406,930 B2 * | 8/2016 | Fukui | ............... H01M 10/0525 |
| 10,468,678 B2 * | 11/2019 | Volkov | ................... C01G 53/50 |

(Continued)

FOREIGN PATENT DOCUMENTS

| | | |
|---|---|---|
| CN | 103094546 A | 5/2013 |
| CN | 107293689 A | 10/2017 |

(Continued)

OTHER PUBLICATIONS

Yong-Chun et al., Construction of homogeneously Al3+doped Ni rich Ni—Co—Mn cathode with high stable cycling performance and storage stability via scalable continuous precipitation, 2018, Electrochimica Acta, vol. 291, pp. 84-89. (Year: 2018).*

(Continued)

*Primary Examiner* — Barbara L Gilliam
*Assistant Examiner* — Angela J Martin
(74) *Attorney, Agent, or Firm* — Lerner David LLP

(57) ABSTRACT
A positive electrode active material precursor for a secondary battery is in the form of a secondary particle in which a plurality of primary particles are aggregated, wherein major axes of the primary particles are arranged in a direction from a center of the secondary particle toward a surface thereof, wherein the primary particle includes crystallines in which a (001) plane is arranged in a direction having an angle of 20° to 160° with respect to a major axis direction of the primary particle. A method of preparing the positive electrode active material precursor is also provided.

14 Claims, 3 Drawing Sheets

(56) References Cited

U.S. PATENT DOCUMENTS

| | | |
|---|---|---|
| 2004/0253516 A1 | 12/2004 | Yuasa et al. |
| 2007/0212602 A1 | 9/2007 | Yuasa et al. |
| 2007/0259266 A1 | 11/2007 | Yuasa et al. |
| 2009/0029253 A1 | 1/2009 | Itou et al. |
| 2010/0316910 A1 | 12/2010 | Kajiyama et al. |
| 2011/0127463 A1 | 6/2011 | Yuasa et al. |
| 2013/0108921 A1 | 5/2013 | Kase et al. |
| 2013/0330626 A1 | 12/2013 | Kajiyama et al. |
| 2014/0027670 A1 | 1/2014 | Sun et al. |
| 2014/0131616 A1 | 5/2014 | Sun et al. |
| 2014/0158932 A1 | 6/2014 | Sun et al. |
| 2014/0356713 A1 | 12/2014 | Sun et al. |
| 2014/0377660 A1 | 12/2014 | Fukui et al. |
| 2015/0108398 A1 | 4/2015 | Kase et al. |
| 2016/0049647 A1 | 2/2016 | Park et al. |
| 2016/0049648 A1 | 2/2016 | Noh et al. |
| 2016/0049649 A1 | 2/2016 | Noh et al. |
| 2016/0049650 A1 | 2/2016 | Noh et al. |
| 2016/0218350 A1 | 7/2016 | Noh et al. |
| 2017/0092935 A1 | 3/2017 | Sun et al. |
| 2017/0305757 A1 | 10/2017 | Oshita et al. |
| 2017/0309891 A1 | 10/2017 | Matsui et al. |
| 2018/0114985 A1 | 4/2018 | Volkov et al. |
| 2018/0151876 A1 | 5/2018 | Kim et al. |
| 2018/0358615 A1 | 12/2018 | Schroedle et al. |
| 2019/0020022 A1 | 1/2019 | Jeong et al. |
| 2019/0148721 A1 | 5/2019 | Park et al. |
| 2019/0260024 A1 | 8/2019 | Nakamura et al. |
| 2019/0296348 A1 | 9/2019 | Kaneda et al. |
| 2019/0386305 A1 | 12/2019 | Volkov et al. |
| 2020/0251731 A1 | 8/2020 | You et al. |
| 2020/0403239 A1 | 12/2020 | Sun et al. |
| 2020/0403240 A1 | 12/2020 | Sun |
| 2021/0234155 A1 | 7/2021 | Jeong et al. |

FOREIGN PATENT DOCUMENTS

| | | | | |
|---|---|---|---|---|
| CN | 108701827 | A | 10/2018 | |
| CN | 110225886 | A | 9/2019 | |
| JP | 2009137834 | A | 6/2009 | |
| JP | 2013147416 | A | 8/2013 | |
| JP | 2016088834 | A | 5/2016 | |
| JP | 2016105366 | A | 6/2016 | |
| JP | 2017130410 | A | 7/2017 | |
| JP | 2017527511 | A | 9/2017 | |
| JP | 2018037393 | A | 3/2018 | |
| JP | 2019006616 | A | 1/2019 | |
| KR | 20110122809 | A | 11/2011 | |
| KR | 20130138073 | A | 12/2013 | |
| KR | 20140126302 | A | 10/2014 | |
| KR | 20150024371 | A | 3/2015 | |
| KR | 20150031344 | A | 3/2015 | |
| KR | 101593401 | * | 2/2016 | ......... H01M 10/052 |
| KR | 101593401 | B1 | 2/2016 | |
| KR | 101684219 | B1 | 12/2016 | |
| KR | 20180040676 | A | 4/2018 | |
| KR | 20180062429 | A | 6/2018 | |
| KR | 20190035716 | A | 4/2019 | |
| KR | 20190036525 | A | 4/2019 | |
| KR | 20190086403 | A | 7/2019 | |
| KR | 20190129518 | A | 11/2019 | |

OTHER PUBLICATIONS

International Search Report for Application No. PCT/KR2021/001203 mailed May 10, 2021, pp. 1-6.

Extended European Search Report including Written Opinion for Application No. 21747432.9 dated Nov. 18, 2022, pp. 1-7.

Li, Yong-Chun et al., "Construction of homogeneously Al3+doped Ni rich Ni—Co—Mn cathode with high stable cycling performance and storage stability via scalable continuous precipitation", Electrochimica Acta, Sep. 21, 2018 (Sep. 21, 2018), pp. 84-94, vol. 291, Elsevier, Amsterdam, NL. XP085507590.

Search Report dated Nov. 29, 2023 from the Office Action for Chinese Application No. 202180006089.0 issued Nov. 30, 2023, 2 pages.

* cited by examiner

[FIG.1]
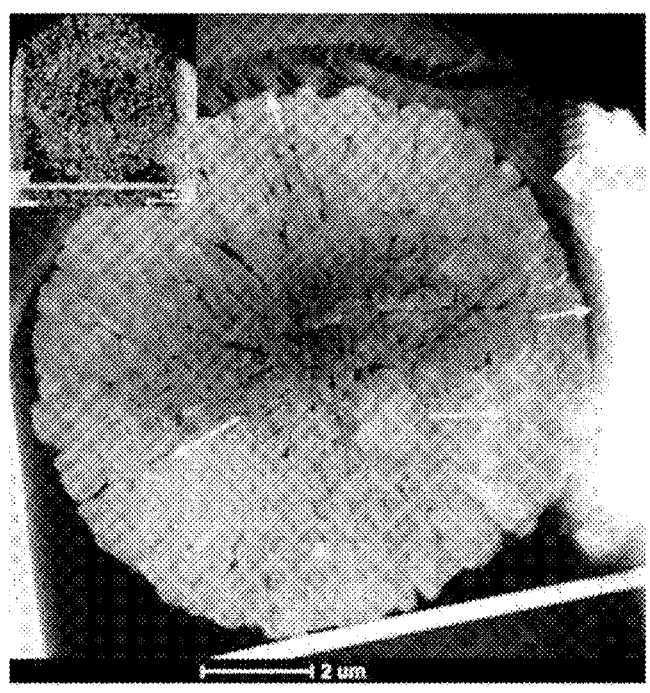
[FIG.2]
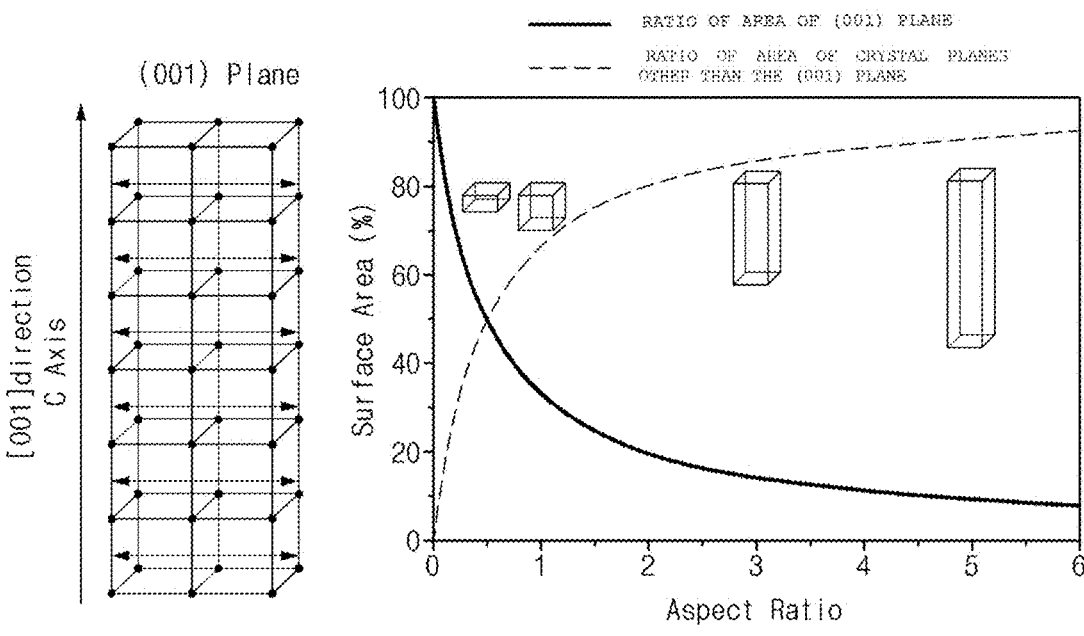

[FIG.3]
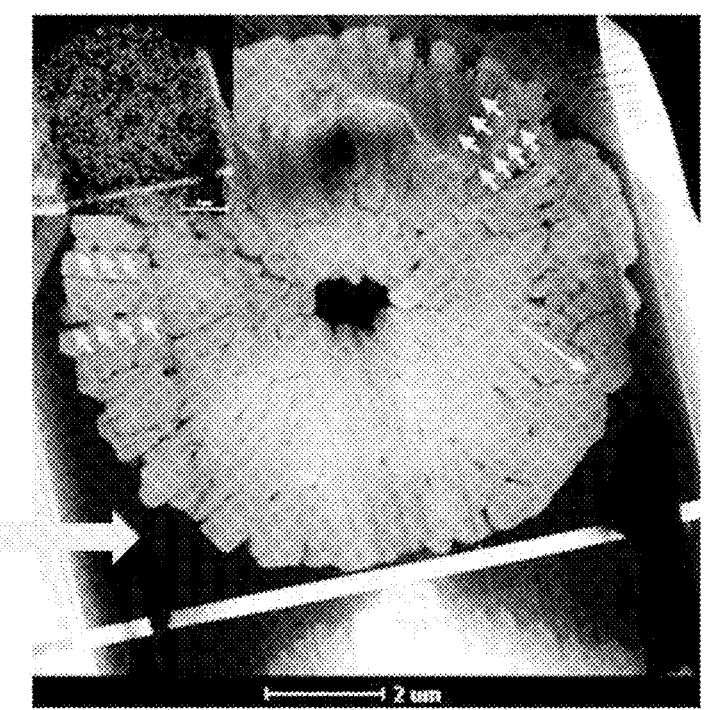
[FIG.4]
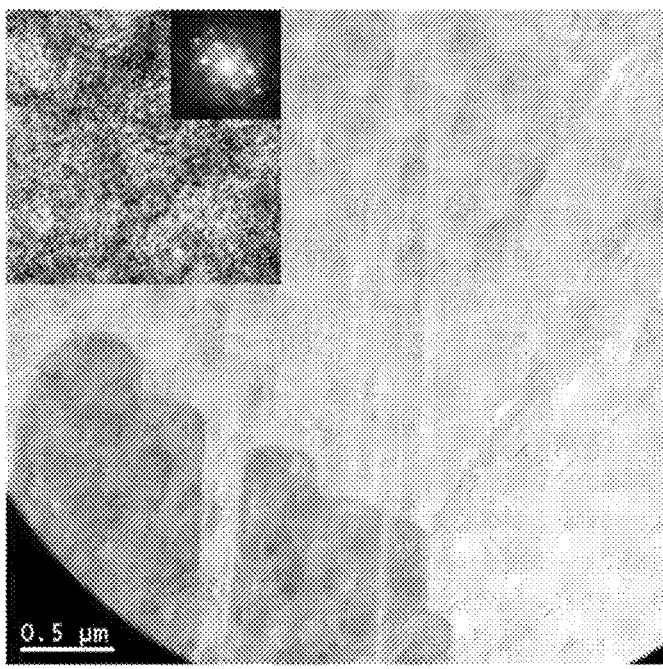

[FIG.5]
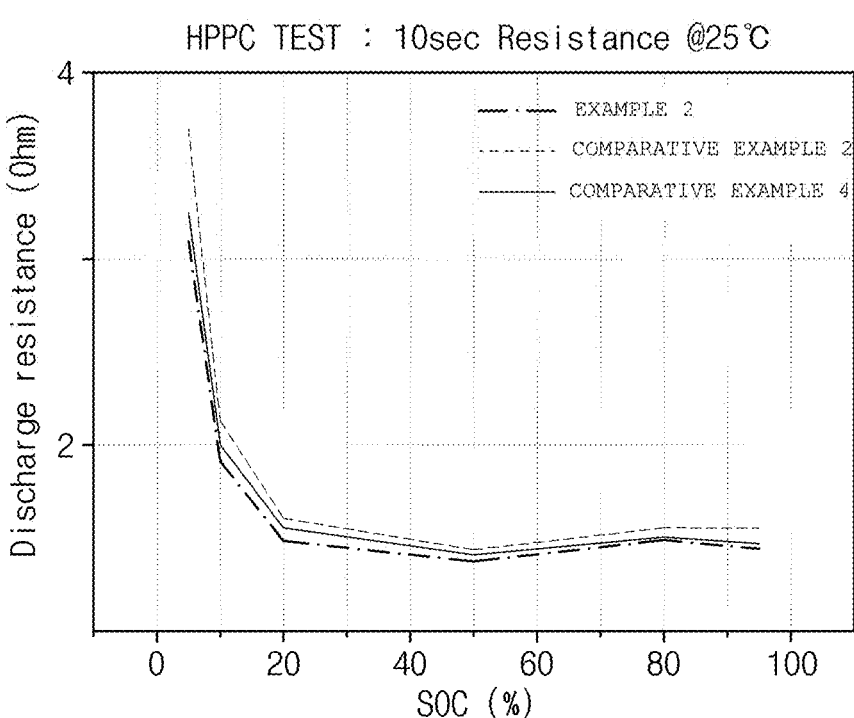

POSITIVE ELECTRODE ACTIVE MATERIAL PRECURSOR FOR SECONDARY BATTERY, POSITIVE ELECTRODE ACTIVE MATERIAL, PREPARATION METHODS THEREOF, AND LITHIUM SECONDARY BATTERY INCLUDING THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2021/001203, filed on Jan. 29, 2021, which claims priority from Korean Patent Application No. 10-2020-0010701, filed on Jan. 29, 2020, the disclosures of which are incorporated by reference herein.

TECHNICAL FIELD

This application claims priority from Korean Patent Application No. 10-2020-0010701, filed on Jan. 29, 2020, the disclosure of which is incorporated by reference herein.

The present invention relates to a positive electrode active material precursor for a secondary battery, a positive electrode active material, preparation methods thereof, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Among them, the lithium cobalt oxide ($LiCoO_2$) has been widely used because of its high operating voltage and excellent capacity characteristics, and has been used as a positive electrode active material for high voltage. However, due to an increase in the price of cobalt (Co) and supply instability, there is a limitation in using a large amount of the lithium cobalt oxide as a power source for applications such as electric vehicles, and thus, there is a need to develop a positive electrode active material that may replace the lithium cobalt oxide.

Accordingly, a nickel cobalt manganese-based lithium composite transition metal oxide (hereinafter, simply referred to as "NCM-based lithium composite transition metal oxide"), in which a portion of cobalt (Co) is substituted with nickel (Ni) and manganese (Mn), has been developed.

In general, an NCM-based positive electrode active material precursor is synthesized through a co-precipitation method, wherein a shape of precursor primary particles is differently formed depending on a co-precipitation condition. In a case in which a positive electrode active material is prepared by using a precursor having a spherical shape or cube shape of primary particles, primary particles of the positive electrode active material are also formed in a spherical shape or cube shape, wherein, in this case, a lithium movement path is increased to reduce lithium mobility. Accordingly, a technique for synthesizing the shape of the primary particles of the precursor into a shape, such as a rod or columnar shape, has been developed. In a case in which the shape of the precursor primary particles is a rod or columnar shape, the primary particles are formed in a radial arrangement from a center of a secondary particle toward a surface direction, and, in a case in which a positive electrode active material is prepared by using a precursor having such a primary particle arrangement, since a distance that lithium ions move along an interface between the primary particles is reduced, an effect of improving the lithium mobility may be obtained. However, with respect to a conventional positive electrode active material formed so that primary particles have a radial arrangement, since a (003) plane, in which intercalation/deintercalation of lithium is not possible, is formed parallel to a major axis direction of the primary particle, there was a limitation in that capacity or output characteristics were degraded.

Thus, there is a need to develop a positive electrode active material precursor and a positive electrode active material having an orientation which may exhibit excellent discharge capacity and output characteristics when used in a lithium secondary battery.

PRIOR ART DOCUMENTS (Patent Document 1) Korean Patent Application Laid-Open Publication No. 2013-0138073

DISCLOSURE OF THE INVENTION

Technical Problem

An aspect of the present invention provides a positive electrode active material precursor, in which an orientation of a crystal structure of primary particles is specifically controlled in a positive electrode active material precursor stage, and a method of preparing the same.

Another aspect of the present invention provides a positive electrode active material prepared by using the precursor in which the orientation of the crystal structure is controlled, and a lithium secondary battery including the same.

Technical Solution

According to an aspect of the present invention, there is provided a positive electrode active material precursor for a secondary battery which is in the form of a secondary particle in which a plurality of primary particles are aggregated, wherein major axes of the primary particles are arranged in a direction from a center of the secondary particle toward a surface thereof, wherein the primary particle includes crystallines in which a (001) plane is arranged in a direction having an angle of 20° to 160° with respect to a major axis direction of the primary particle.

According to another aspect of the present invention, there is provided a method of preparing the positive electrode active material precursor for a secondary battery which includes: forming a positive electrode active material precursor by a co-precipitation reaction while adding a transition metal-containing solution containing cations of nickel (Ni), cobalt (Co), and manganese (Mn), an aluminum-containing solution containing cations of aluminum (Al), a basic aqueous solution, and an ammonium solution to a reactor, wherein the aluminum-containing solution includes sodium aluminate ($NaAlO_2$).

According to another aspect of the present invention, there is provided a positive electrode active material for a secondary battery which is in the form of a secondary particle in which a plurality of primary particles are aggregated, wherein major axes of the primary particles are arranged in a direction from a center of the secondary particle toward a surface thereof, wherein the primary particle includes crystallines in which a (003) plane is arranged in a direction having an angle of 20° to 160° with respect to a major axis direction of the primary particle.

According to another aspect of the present invention, there is provided a positive electrode and a lithium secondary battery which include the positive electrode active material.

Advantageous Effects

In a positive electrode active material precursor according to the present invention, since a (001) plane of a crystalline is formed not parallel to a major axis direction of a primary particle, but is formed to deviate from the major axis direction, a contact area between an interface of the primary particles, which is a lithium movement path, and a (003) plane, in which intercalation/deintercalation of lithium is not possible, is reduced when a positive electrode active material is prepared by using the positive electrode active material precursor.

Thus, the positive electrode active material prepared by using the positive electrode active material precursor of the present invention has better lithium mobility than a conventional positive electrode active material, and an effect of improving capacity characteristics and output characteristics may be obtained when the positive electrode active material is used in a lithium secondary battery.

BRIEF DESCRIPTION OF THE DRAWINGS

FIG. 1 is a cross-sectional scanning transmission electron microscope (STEM) image of a conventional positive electrode active material in which a (003) plane is formed in a direction parallel to a major axis of a primary particle. Arrows in the drawing indicate a (003) plane direction. An image on an upper left side of FIG. 1 is an STEM-EDX (energy dispersive X-ray) mapping image;

FIG. 2 is a crystal structure of a primary particle of a positive electrode active material precursor according to an embodiment of the present invention and a graph showing a ratio of a surface area of a (001) plane according to an aspect ratio of the primary particle;

FIG. 3 is a cross-sectional scanning transmission electron microscope (STEM) image of a positive electrode active material according to an embodiment of the present invention. In the drawing, short arrows indicate a (003) plane direction, and a long arrow indicates a major axis direction of a primary particle. As shown in the drawing, in the positive electrode active material according to the present invention, a (003) plane is arranged not parallel to a major axis of the primary particle, but is arranged to have an angle of 20° to 160°. An image on an upper left side of FIG. 3 is an STEM-EDX (energy dispersive X-ray) mapping image;

FIG. 4 is a cross-sectional TEM image of a positive electrode active material precursor prepared in Example 1; and FIG. 5 is a graph illustrating capacity and output characteristics of lithium secondary batteries respectively using positive electrode active materials prepared in Example 2 and Comparative Examples 3 and 4.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, the expression "crystalline" means a single crystal unit having a regular atomic arrangement, and crystalline structures of a positive electrode active material precursor and a positive electrode active material may be confirmed by transmission electron microscope (TEM/STEM) analysis.

In the present invention, the expression "primary particle" denotes a smallest particle unit which is distinguished as one body when a cross section of a positive electrode active material particle or a positive electrode active material precursor particle is observed through a scanning transmission electron microscope (STEM), wherein it may be composed of a single grain, or may also be composed of a plurality of grains. In the present invention, an average particle diameter of the primary particle may be measured by a method of measuring a size of each particle distinguished from a cross-sectional STEM image of the positive electrode active material particles and calculating an arithmetic average value thereof.

In the present invention, the expression "secondary particle" denotes a secondary structure formed by aggregation of a plurality of primary particles. An average particle diameter of the secondary particle may be measured using a particle size analyzer, and, in the present invention, Microtrac S3500 was used as the particle size analyzer.

The expression "particle diameter $D_n$" of the positive electrode active material in the present invention denotes a particle diameter at n % of cumulative distribution of volume according to the particle diameter. That is, $D_{50}$ is a particle diameter at 50% of the cumulative distribution of volume according to the particle diameter, $D_{90}$ is a particle diameter at 90% of the cumulative distribution of volume according to the particle diameter, and $D_{10}$ is a particle diameter at 10% of the cumulative distribution of volume according to the particle diameter. The $D_n$ may be measured by using a laser diffraction method. Specifically, after dispersing measurement target powder in a dispersion medium (distilled water), the dispersion medium is introduced into a commercial laser diffraction particle size measurement instrument (e.g., Microtrac S3500) and a particle size distribution is calculated by measuring a difference in diffraction patterns due to a particle size when particles pass through a laser beam. The $D_{10}$, $D_{50}$, and $D_{90}$ may be measured by calculating particle diameters at 10%, 50%, and 90% of the cumulative distribution of volume according to the particle diameter using the measurement instrument.

Hereinafter, the present invention will be described in detail.

<Positive Electrode Active Material Precursor>

The positive electrode active material precursor according to the present invention is characterized in that it is a positive electrode active material precursor in the form of a secondary particle in which a plurality of primary particles are aggregated, wherein, in this case, major axes of the primary particles are arranged in a direction from a center of the secondary particle toward a surface thereof, wherein the primary particle includes crystallines in which a (001) plane is arranged in a direction having an angle of 20° to 160° with respect to a major axis direction of the primary particle.

A conventional positive electrode active material precursor was prepared in the form in which spherical primary particles are randomly arranged without an orientation. In a case in which a positive electrode active material is prepared by using the positive electrode active material precursor having a structure in which the primary particles are randomly arranged without an orientation as described above, primary particles of the positive electrode active material are also present in an unaligned form. Since lithium ions move along an interface between the primary particles in a positive electrode active material particle, a lithium movement path between the primary particles (intraparticle) is increased when the primary particles are randomly arranged in the positive electrode active material particle, and thus, there is a problem in that output characteristics are degraded.

In order to solve this problem, a positive electrode active material precursor having a structure, in which primary particles in the form of rods or columns are arranged radially from a center of a secondary particle to a surface direction, has been developed as shown in FIG. 1. In a case in which a positive electrode active material is prepared by using the positive electrode active material precursor in which the primary particles are radially arranged as described above, primary particles of the positive electrode active material also maintain a radial arrangement, and, accordingly, a lithium movement path between the primary particles may be minimized to obtain an effect of improving lithium mobility. However, with respect to positive electrode active materials developed to date, a (001) plane of the precursor was grown parallel to a major axis direction of the primary particle. Since the (001) plane of the precursor is converted to a (003) plane of the positive electrode active material after sintering, the (003) plane of the positive electrode active material is arranged parallel to the major axis direction of the primary particle when the positive electrode active material is prepared by using the precursor. Since the (003) plane of the positive electrode active material is a plane in which intercalation/deintercalation of lithium ions is not possible, there is a problem in that capacity characteristics and output characteristics are degraded when an area of the (003) plane exposed to the lithium movement path is large.

In order to improve this problem, in the present invention, since major axes of the primary particles are arranged in a direction from a center of the secondary particle toward a surface thereof, but a (001) plane of a crystalline in the primary particle is formed not parallel to a major axis direction of the primary particle, an area of the (001) plane exposed to an interface of the primary particles is minimized to improve capacity, charge and discharge efficiency, and output characteristics.

Specifically, in the positive electrode active material precursor according to the present invention, the primary particle includes crystallines in which the (001) plane is arranged in a direction not parallel to the major axis direction of the primary particle, and, more specifically, includes crystallines in which the (001) plane is arranged in a direction having an angle of 20° to 160°, for example, 40° to 140° with respect to the major axis direction of the primary particle.

The positive electrode active material precursor of the present invention may be composed of a hydroxide containing nickel (Ni), cobalt (Co), manganese (Mn), and aluminum (Al). Preferably, the positive electrode active material precursor may contain aluminum (Al) among total metallic elements in a concentration of 1 mol % or more, and may more preferably contain the aluminum (Al) in a concentration of 1 mol % to 10 mol %. In a case in which the aluminum (Al) is contained within the above concentration range, cation disordering and the formation of oxygen vacancy may be suppressed.

The aluminum (Al) may be contained at a constant concentration without a concentration gradient in the secondary particle, that is, regardless of a position within the particle. Since the aluminum (Al) is distributed at a constant concentration without the concentration gradient in the secondary particle, an aluminum (Al) agglomeration phenomenon may be suppressed to minimize capacity reduction and increase an effect of improving life characteristics and resistance increase rate characteristics with a small amount of the aluminum (Al).

Preferably, the positive electrode active material precursor according to the present invention may be a transition metal hydroxide represented by Formula 1 below.

$$Ni_{x1}Co_{y1}Mn_{z1}Al_{s1}(OH)_2 \qquad \text{[Formula 1]}$$

In Formula 1, x1 represents a molar ratio of nickel among total metallic elements in the transition metal hydroxide, wherein x1 may satisfy $0.7 \leq x \leq 0.99$, $0.8 \leq x \leq 0.99$, $0.85 \leq x \leq 0.99$, or $0.88 \leq x \leq 0.99$.

y1 represents a molar ratio of cobalt among the total metallic elements in the transition metal hydroxide, wherein y1 may satisfy $0 < y1 < 0.3$, $0 < y1 < 0.2$, $0 < y1 < 0.15$, or $0 < y1 < 0.12$.

z1 represents a molar ratio of manganese among the total metallic elements in the transition metal hydroxide, wherein z1 may satisfy $0 < z1 < 0.3$, $0 < z1 < 0.2$, $0 < z1 < 0.15$, or $0 < z1 < 0.12$.

s1 represents a molar ratio of aluminum among the total metallic elements in the transition metal hydroxide, wherein s1 may satisfy $0.01 \leq s \leq 0.1$, $0.01 \leq s \leq 0.08$, or $0.01 \leq s \leq 0.05$.

The primary particle of the positive electrode active material precursor may have a columnar shape, and, in this case, an aspect ratio of the primary particle may be 3 or more. More preferably, the aspect ratio of the primary particle of the positive electrode active material precursor may be in a range of 3 to 15, for example, 5 to 8. When the aspect ratio of the primary particle of the positive electrode active material precursor satisfies the above range, since a surface area of crystal planes, in which the intercalation/deintercalation of lithium at the interface between the primary particles, as a lithium movement path, is possible, is increased, a positive electrode active material having excellent capacity and output characteristics may be prepared.

In FIG. 2, a crystalline structure of a positive electrode active material precursor according to an embodiment of the present invention and a graph showing a ratio of surface areas of a (001) plane and a crystal plane, in which inter-calation/deintercalation of lithium ions on an outer surface of the primary particle is possible, according to the aspect ratio are illustrated.

As illustrated in FIG. 2, in the positive electrode active material precursor according to the present invention, the (001) plane is arranged in a direction that is not parallel to a growth direction of the crystal structure (major axis direction of the primary particle) (e.g., vertical direction), and, accordingly, an area in which crystal planes other than the (001) plane are exposed to the interface between the primary particles is wider than that of a conventional posi-tive electrode active material precursor. Also, a ratio of exposure of the crystal planes other than the (001) plane to the outer surface of the primary particle increases as the aspect ratio of the primary particle increases. Thus, in a case in which a positive electrode active material is prepared by using the positive electrode active material precursor as described above, since a surface area of the (003) surface exposed to the outer surface of the primary particle may be minimized, the capacity and output characteristics may be improved.

Next, a method of preparing the positive electrode active material precursor of the present invention will be described.

The positive electrode active material precursor of the present invention is formed by a co-precipitation reaction while adding a transition metal-containing solution contain-ing cations of nickel (Ni), cobalt (Co), and manganese (Mn), an aluminum-containing solution containing cations of alu-minum (Al), a basic aqueous solution, and an ammonium solution to a reactor, wherein the aluminum-containing solution is prepared by including sodium aluminate (NaAlO$_2$).

The method of preparing the positive electrode active material precursor will be described in detail for each step.

First, a positive electrode active material precursor is prepared by a co-precipitation reaction while adding a transition metal-containing solution containing cations of nickel (Ni), cobalt (Co), and manganese (Mn), an alumi-num-containing solution containing cations of aluminum (Al), a basic aqueous solution, and an ammonium solution to a reactor.

The transition metal-containing solution, for example, may include a nickel (Ni)-containing raw material, a cobalt (Co)-containing raw material, and a manganese (Mn)-con-taining raw material.

The nickel (Ni)-containing raw material, for example, may be nickel-containing acetic acid salts, nitrates, sulfates, halides, sulfides, hydroxides, oxides, or oxyhydroxides, and may specifically be Ni(OH)$_2$, NiO, NiOOH, NiCO$_3$.2Ni (OH)$_2$.4H$_2$O, NiC$_2$O$_2$.2H$_2$O, Ni(NO$_3$)$_2$.6H$_2$O, NiSO$_4$, NiSO$_4$.6H$_2$O, a fatty acid nickel salt, a nickel halide, or a combination thereof, but the present invention is not limited thereto.

The cobalt (Co)-containing raw material may be cobalt-containing acetic acid salts, nitrates, sulfates, halides, sul-fides, hydroxides, oxides, or oxyhydroxides, and may spe-cifically be Co(OH)$_2$, CoOOH, Co(OCOCH$_3$)$_2$.4H$_2$O, Co(NO$_3$)$_2$.6H$_2$O, CoSO$_4$, Co(SO$_4$)$_2$.7H$_2$O, or a combination thereof, but the present invention is not limited thereto.

The manganese (Mn)-containing raw material, for example, may be manganese-containing acetic acid salts, nitrates, sulfates, halides, sulfides, hydroxides, oxides, oxy-hydroxides, or a combination thereof, and may specifically be a manganese oxide such as Mn$_2$O$_3$, MnO$_2$, and Mn$_3$O$_4$; a manganese salt such as MnCO$_3$, Mn(NO$_3$)$_2$, MnSO$_4$, manganese acetate, manganese dicarboxylate, manganese citrate, and a fatty acid manganese salt; a manganese oxy-hydroxide, manganese chloride, or a combination thereof, but the present invention is not limited thereto.

The transition metal-containing solution may be prepared by adding the nickel (Ni)-containing raw material, the cobalt (Co)-containing raw material, and the manganese (Mn)-containing raw material to a solvent, specifically water, or a mixture of water and an organic solvent (e.g., alcohol etc.) which may be uniformly mixed with the water, or may be prepared by mixing an aqueous solution of the nickel (Ni)-containing raw material, an aqueous solution of the cobalt (Co)-containing raw material, and the manganese (Mn)-containing raw material.

The aluminum-containing solution includes sodium alu-minate (NaAlO$_2$) as an aluminum (Al)-containing mate-rial. The sodium aluminate (NaAlO$_2$) forms AlO(OH), instead of Al(OH)$_3$, during the co-precipitation reaction. Since the AlO(OH) has a different steric effect from the Al(OH)$_3$, crystallines are formed in a form in which the (001) plane is disposed in a direction not parallel to the major axis direction of the primary particle, specifically, a direction having an angle of 20° to 160° with respect to the major axis direction of the primary particle, when the sodium aluminate is used as the Al-containing raw material during the preparation of the precursor.

The ammonium solution, as a complexing agent, for example, may include NH$_4$OH, (NH$_4$)$_2$SO$_4$, NH$_4$NO$_3$, NH$_4$Cl, CH$_3$COONH$_4$, NH$_4$CO$_3$, or a combination thereof, but the present invention is not limited thereto. The ammo-nium solution may be used in the form of an aqueous solution, and, in this case, water or a mixture of water and an organic solvent (specifically, alcohol etc.), which may be uniformly mixed with the water, may be used as a solvent.

The basic solution, as a precipitant, may include a hydrox-ide of alkali metal or alkaline earth metal, such as NaOH, KOH, or Ca(OH)$_2$, a hydrate thereof, or an alkaline com-pound of a combination thereof. The basic solution may also be used in the form of an aqueous solution, and, in this case, water or a mixture of water and an organic solvent (specifi-cally, alcohol etc.), which may be uniformly mixed with the water, may be used as a solvent.

The basic solution is added to adjust a pH of a reaction solution, wherein the basic solution may be added in an amount such that the pH of the metal solution is in a range of 11 to 13.

The co-precipitation reaction may be performed at a temperature of 40° C. to 70° C. in an inert atmosphere such as nitrogen or argon.

A transition metal hydroxide having a specific orientation of the present invention, for example, nickel-cobalt-manga-nese-aluminum hydroxide particles are formed by the above-described process and precipitated in the reaction solution. The precipitated transition metal hydroxide par-ticles may be separated according to a conventional method and dried to obtain a positive electrode active material precursor.

<Positive Electrode Active Material>

Also, the present invention provides a positive electrode active material which is prepared by using the positive electrode active material precursor according to the present invention.

Specifically, the positive electrode active material may be prepared through a step of mixing the positive electrode active material precursor with a lithium source and sintering the mixture to form a lithium transition metal oxide.

As the lithium source, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium source may be $Li_2CO_3$, $LiNO_3$, $LiNO_2$, LiOH, $LiOH \cdot H_2O$, LiH, LiF, LiCl, LiBr, LiI, $CH_3COOLi$, $Li_2O$, $Li_2SO_4$, $CH_3COOLi$, or $Li_3C_6H_5O_7$, and any one thereof or a mixture of two or more thereof may be used.

The positive electrode active material precursor and the lithium source may be mixed and sintered at 730° C. to 830° C. to form a lithium transition metal oxide. Preferably, the sintering may be performed at 750° C. to 810° C., for example, 780° C. to 800° C., and the sintering may be performed for 5 hours to 20 hours, for example, 8 hours to 15 hours.

If necessary, a raw material containing doping element $M^1$ may be further mixed during the sintering. $M^1$, for example, may be at least one selected from the group consisting of zirconium (Zr), boron (B), tungsten (W), magnesium (Mg), cerium (Ce), hafnium (Hf), tantalum (Ta), lanthanum (La), titanium (Ti), strontium (Sr), barium (Ba), fluorine (F), phosphorus (P), and sulfur (S), and the raw material containing the doping element $M^1$ may be $M^1$-containing acetates, nitrates, sulfates, halides, sulfides, hydroxides, oxides, oxyhydroxides, or a combination thereof. In a case in which $M^1$ is additionally mixed during the sintering, since the $M^1$ element is diffused into the lithium transition metal oxide and is doped by the sintering, an effect of improving structural stability of the positive electrode active material may be obtained.

The positive electrode active material of the present invention thus prepared is a positive electrode active material in the form of a secondary particle in which a plurality of primary particles are aggregated, wherein major axes of the primary particles are arranged in a direction from a center of the secondary particle toward a surface thereof, wherein the primary particle may include crystallines in which a (003) plane is arranged in a direction having an angle of 20° to 160°, for example, 40° to 140° with respect to a major axis direction of the primary particle.

In the positive electrode active material of the present invention, the major axes of the primary particles are arranged in a direction from the center of the secondary particles toward the surface thereof, and, in this case, the primary particle may have a columnar shape. Since lithium ions move along an interface between the primary particles in a positive electrode active material particle, a lithium movement path is shortened in comparison to a case where the primary particles are randomly arranged, when the primary particles are arranged in the direction from the center of the secondary particle toward the surface thereof, and, thus lithium mobility is improved.

The (001) plane of the positive electrode active material precursor is converted to the (003) plane of the positive electrode active material through sintering, wherein the intercalation/deintercalation of lithium ions is not possible in the (003) plane. Thus, when the area of the (003) plane exposed to the lithium movement path is large, the capacity characteristics and output characteristics are degraded.

However, since the positive electrode active material of the present invention is prepared by using the positive electrode active material precursor in which the (001) plane is arranged at an angle of 20° to 160°, for example, 40° to 140° with respect to the major axis direction of the primary particle, the (003) plane in the crystalline of the positive electrode active material is arranged in a direction having an angle of 20° to 160°, for example, 40° to 140° with respect to the major axis direction of the primary particle.

Accordingly, since the exposure of the (003) plane, in which the intercalation/deintercalation of lithium is not possible, to the surface of the primary particle is minimized, the positive electrode active material of the present invention exhibits excellent capacity, charge and discharge efficiency, and output characteristics.

FIG. 3 illustrates a positive electrode active material according to an embodiment of the present invention, wherein short arrows in the drawing mean a direction in which the (003) plane is arranged. Through FIG. 3, it may be confirmed that the (003) plane of the positive electrode active material of the present invention was arranged in a direction not parallel to the major axis direction of the primary particle, specifically, in a direction having an angle of 20° to 160° or 40° to 140° with respect to the major axis direction.

The positive electrode active material of the present invention may be composed of a lithium transition metal oxide containing nickel (Ni), cobalt (Co), manganese (Mn), and aluminum (Al). Preferably, the lithium transition metal oxide may contain aluminum (Al) among total metallic elements excluding lithium in a concentration of 1 mol % or more, for example, 1 mol % to 10 mol %. In a case in which the aluminum (Al) is contained within the above concentration range, cation disordering and the formation of oxygen vacancy may be suppressed, and, accordingly, the life characteristics and resistance increase rate characteristics may be improved.

The aluminum (Al) may be contained without a concentration gradient in the secondary particle of the positive electrode active material. Since the aluminum (Al) is uniformly distributed in the secondary particle without the concentration gradient, an aluminum (Al) agglomeration phenomenon may be suppressed to minimize capacity reduction and increase an effect of improving the life characteristics and resistance increase rate characteristics with a small amount of the aluminum (Al).

The positive electrode active material according to the present invention may be a lithium transition metal oxide represented by [Formula 2] below.

$$Li_a[Ni_{x1}Co_{y1}Mn_{z1}Al_{s1}]_{1-b}M^1{}_bO_2 \qquad \text{[Formula 2]}$$

In Formula 2, a represents a molar ratio of lithium to transition metals in the lithium transition metal oxide, wherein a may satisfy $0.8 \leq a \leq 1.2$, $0.9 \leq a \leq 1.2$, or $0.9 \leq a \leq 1.1$.

x1 represents a molar ratio of nickel among total transition metal elements in the lithium transition metal oxide, wherein x1 may satisfy $0.7 \leq x \leq 0.99$, $0.8 \leq x \leq 0.99$, $0.85 \leq x \leq 0.99$, or $0.88 \leq x \leq 0.99$.

y1 represents a molar ratio of cobalt among the total transition metal elements in the lithium transition metal oxide, wherein y1 may satisfy $0 < y1 < 0.3$, $0 < y1 < 0.2$, $0 < y1 < 0.15$, or $0 < y1 < 0.12$.

z1 represents a molar ratio of manganese among the total transition metal elements in the lithium transition metal oxide, wherein z1 may satisfy $0 < z1 < 0.3$, $0 < z1 < 0.2$, $0 < z1 < 0.15$, or $0 < z1 < 0.12$.

s1 represents a molar ratio of aluminum among the total transition metal elements in the lithium transition metal oxide, wherein s1 may satisfy $0.01 \leq s \leq 0.1$, $0.01 \leq s \leq 0.08$, or $0.01 \leq s \leq 0.05$.

$M^1$ is a doping element doped in the lithium transition metal oxide, and, for example, may be at least one selected from the group consisting of Zr, B, W, Mg, Ce, Hf, Ta, La, Ti, Sr, Ba, F, P, and S.

b represents a molar ratio of the doping element $M^1$ substituted for transition metal sites in the lithium transition metal oxide, wherein b may satisfy $0 \leq b \leq 0.1$ or $0 \leq b \leq 0.05$.

<Positive Electrode and Lithium Secondary Battery>

According to another embodiment of the present invention, provided are a positive electrode for a secondary battery and a lithium secondary battery which include the positive electrode active material prepared as described above.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated-EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a positive electrode material mixture, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the positive electrode material mixture on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a negative electrode material mixture, which includes selectively the binder and the conductive agent as well as the negative electrode active material, on the negative electrode collector and drying the coated negative electrode collector, or may be prepared by casting the negative electrode material mixture on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move.

Specifically, an ester-based solvent such as methyl acetate, ethyl acetate, α-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexamethylphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

PREFERRED MODE FOR CARRYING OUT THE INVENTION

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

After 4 liters of distilled water was put in a reactor (capacity 20 L), the temperature was maintained at 58° C., a transition metal aqueous solution with a concentration of 2.29 mol/L, in which $NiSO_4$, $CoSO_4$, and $MnSO_4$ were mixed in amounts such that a molar ratio of nickel:cobalt: manganese was 88:5:7, and a solution, in which $NaAlO_2$ was dissolved in a sodium hydroxide solution, with a concentration of 0.291 mol/L were added to the reactor at rates of 500 ml/hr and 100 mL/hr, respectively, and a 9 wt % aqueous ammonia solution was continuously added to the reactor at a rate of 510 ml/hr. Also, a 15 wt % aqueous sodium hydroxide solution was added at a rate of 206 ml/hr, and the addition of the aqueous sodium hydroxide solution was adjusted so that a pH was maintained at 11.7.

In the first 30 minutes, nucleation was performed while stirring at 600 rpm, and, thereafter, particles were grown while stirring at 250 rpm to 600 rpm. When the inside of the batch-type reactor was filled by performing a co-precipitation reaction for 20 hours, the stirring was stopped, the precursor particles were precipitated, and, after removing a supernatant and leaving 4 L of the reactants, the reaction was performed again. The reaction was performed for a total of 40 hours to form precursor particles. The precursor particles were separated, washed in water, dried in a warm air dryer at 130° C. for 12 hours or more, disintegrated, and sieved to prepare a $Ni_{0.86}Co_{0.05}Mn_{0.07}Al_{0.02}(OH)_2$ positive electrode active material precursor.

Example 2

The positive electrode active material precursor prepared in Example 1, LiOH, and $ZrO_2$ were mixed in amounts such that a molar ratio of Ni+Co+Mn+Al:Li:Zr was 1:1.07: 0.0015, and sintered at 790° C. for 10 hours in an oxygen atmosphere to prepare a $Li[Ni_{0.86}Co_{0.05}Mn_{0.07} Al_{0.02}]_{0.9985}Zr_{0.0015}O_2$ positive electrode active material doped with 1,500 ppm of Zr.

Comparative Example 1

After 4 liters of distilled water was put in a reactor (capacity 20 L), the temperature was maintained at 58° C., a transition metal aqueous solution with a concentration of 2.29 mol/L, in which $NiSO_4$, $CoSO_4$, and $MnSO_4$ were mixed in amounts such that a molar ratio of nickel:cobalt: manganese was 88:5:7, was added to the reactor at a rate of 510 ml/hr, and a 9 wt % aqueous ammonia solution was continuously added to the reactor at a rate of 680 ml/hr. Also, a 15 wt % aqueous sodium hydroxide solution was added at a rate of 612 ml/hr, and the addition of the aqueous sodium hydroxide solution was adjusted so that a pH was maintained at 11.6.

In the first 30 minutes, nucleation was performed while stirring at 600 rpm, and, thereafter, particles were grown while stirring at 250 rpm to 600 rpm. When the inside of the batch-type reactor was filled by performing a co-precipitation reaction for 20 hours, the stirring was stopped, the precursor particles were precipitated, and, after removing a supernatant and leaving 4 L of the reactants, the reaction was performed again. The reaction was performed for a total of 40 hours to form precursor particles. The precursor particles were separated, washed in water, dried in a warm air dryer at 130° C. for 12 hours or more, disintegrated, and sieved to prepare a $Ni_{0.88}Co_{0.05}Mn_{0.07}(OH)_2$ positive electrode active material precursor.

Comparative Example 2

After 4 liters of distilled water was put in a reactor (capacity 20 L), the temperature was maintained at 58° C., a transition metal aqueous solution with a concentration of 2.29 mol/L, in which $NiSO_4$, $CoSO_4$, and $MnSO_4$ were mixed in amounts such that a molar ratio of nickel:cobalt: manganese was 88:5:7, and an $Al(NO_3)_3$ aqueous solution with a concentration of 1.145 mol/L were added to the reactor at rates of 500 ml/hr and 20 mL/hr, respectively, and a 9 wt % aqueous ammonia solution was continuously added to the reactor at a rate of 510 ml/hr. Also, a 15 wt % aqueous sodium hydroxide solution was added at a rate of 306 ml/hr, and the addition of the aqueous sodium hydroxide solution was adjusted so that a pH was maintained at 11.4.

In the first 30 minutes, nucleation was performed while stirring at 600 rpm, and, thereafter, particles were grown while stirring at 250 rpm to 600 rpm. When the inside of the batch-type reactor was filled by performing a co-precipitation reaction for 20 hours, the stirring was stopped, the precursor particles were precipitated, and, after removing a supernatant and leaving 4 L of the reactants, the reaction was performed again. The reaction was performed for a total of 40 hours to form precursor particles. The precursor particles were separated, washed in water, dried in a warm air dryer at 130° C. for 12 hours or more, disintegrated, and sieved to prepare a $Ni_{0.86}Co_{0.05}Mn_{0.07}Al_{0.02}(OH)_2$ positive electrode active material precursor.

Comparative Example 3

The positive electrode active material precursor prepared in Comparative Example 1, LiOH, $Al_2O_3$, and $ZrO_2$ were mixed in amounts such that a molar ratio of Ni+Co+Mn:Li: Al:Zr was 1:1.07:0.02:0.0015, and sintered at 770° C. for 10 hours in an oxygen atmosphere to prepare a $Li[Ni_{0.88}Co_{0.05}Mn_{0.07}]_{0.9785}Al_{0.02}Zr_{0.0015}O_2$ positive electrode active material doped with 1,500 ppm of Zr.

Comparative Example 4

The positive electrode active material precursor prepared in Comparative Example 2, LiOH, and $ZrO_2$ were mixed in amounts such that a molar ratio of Ni+Co+Mn+Al:Li:Zr was 1:1.07:0.0015, and sintered at 790° C. for 10 hours in an oxygen atmosphere to prepare a $Li[Ni_{0.86}Co_{0.05}Mn_{0.07}Al_{0.02}]_{0.9985}Zr_{0.0015}O_2$ positive electrode active material doped with 1,500 ppm of Zr.

Experimental Example 1: Crystal Orientation Identification

Transmission electron microscope (TEM) analysis was performed on the positive electrode active material precursor of Example 1, and an angle between a major axis of a primary particle and a (001) plane was confirmed by a FAST Fourier Transform (FFT) pattern of a high resolution image. A cross-sectional TEM image of the positive electrode active material precursor prepared in Example 1 was illustrated in FIG. 4.

As a result of confirming the FFT pattern of the high resolution image, it may be confirmed that the angle formed by the (001) plane with the major axis of the primary particle in the positive electrode active material precursor of Example 1 was 54°.

Also, cross-sectional STEM analysis was performed on the positive electrode active material of Example 2 and the positive electrode active material of Comparative Example 4, and an angle between a major axis of a primary particle and a (003) plane was confirmed by a selected area diffraction pattern (SADP).

FIG. 1 is a cross-sectional STEM image of the positive electrode active material prepared in Comparative Example 4, and arrows in the drawing indicate a (003) plane direction. As illustrated in FIG. 1, it may be confirmed that the positive electrode active material of Comparative Example 4 had a radial arrangement structure in which a major axis of a columnar-shaped primary particle was arranged from a center of a secondary particle toward a surface direction.

Also, as a result of confirming by the SADP, it may be confirmed that the (003) plane was grown in a direction parallel to a major axis direction of the primary particle in the positive electrode active material of Comparative Example 4.

FIG. 3 is a cross-sectional STEM image of the positive electrode active material prepared in Example 2, and, in the drawing, short arrows indicate a (003) plane direction, and a long arrow indicates a major axis direction of a primary particle. As illustrated in FIG. 3, it may be confirmed that the positive electrode active material of Example 2 had a radial arrangement structure in which the major axis of the columnar-shaped primary particle is arranged from a center of a secondary particle toward a surface direction. Also, as a result of confirming by the SADP, in the positive electrode active material of Example 2, an angle formed by a (003) plane with the major axis of the primary particle was 54°.

Experimental Example 2: Capacity, Output Characteristics

Each of the positive electrode active materials prepared in Example 2 and Comparative Examples 3 and 4, a carbon black conductive agent, and a PVdF binder were mixed in an N-methylpyrrolidone solvent at a weight ratio of 96:2:2 to prepare a positive electrode material mixture, and one surface of an aluminum current collector was coated with the positive electrode material mixture, dried at 100° C., and then rolled to prepare a positive electrode.

Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/ethylmethyl carbonate/diethyl carbonate (mixing volume ratio of EC/EMC/DEC-3/4/3).

Each lithium secondary battery half-cell prepared as described above was charged at a constant current of 1 C to 4.25 V at 25° C. and cut-off charged at 3 C. Thereafter, each lithium secondary battery half-cell was discharged at a constant current of 0.1 C to a voltage of 3.0 V to evaluate capacity, efficiency, and output characteristics. The results thereof are presented in the following Table 1 and FIG. 5.

TABLE 1

|  | Charge capacity (0.1 C) (mAh/g) | Discharge capacity (0.1 C) (mAh/g) | Efficiency (%) |
|---|---|---|---|
| Example 2 | 231.1 | 212.6 | 92 |
| Comparative Example 3 | 228.6 | 204.9 | 89.7 |
| Comparative Example 4 | 230.0 | 208.1 | 90.5 |

Referring to Table 1, capacity or efficiency of the positive electrode active material of Example 2 measured was the best, and, as illustrated in FIG. 5, room-temperature output characteristics of Example 2 were also significantly better.

The invention claimed is:

1. A positive electrode active material precursor for a secondary battery, the positive electrode active material precursor being in a form of a secondary particle in which a plurality of primary particles are aggregated, wherein major axes of the primary particles are arranged in a direction from a center of the secondary particle toward a surface thereof, wherein the primary particle comprises crystallines in which a (001) plane is arranged in a direction having an angle of 20° to 160° with respect to a major axis direction of the primary particle, wherein the positive electrode active material precursor is a hydroxide containing nickel (Ni), cobalt (Co), manganese (Mn), and aluminum (Al).

2. The positive electrode active material precursor of claim 1, wherein the primary particle comprises crystallines in which the (001) plane is arranged in a direction having an angle of 40° to 140° with respect to the major axis direction of the primary particle.

3. The positive electrode active material precursor of claim 1, wherein the positive electrode active material precursor contains aluminum (Al) among total metallic elements in a concentration of 1 mol % or more.

4. The positive electrode active material precursor of claim 1, wherein the positive electrode active material precursor contains aluminum (Al) among total metallic elements in a concentration of 1 mol % to 10 mol %.

5. The positive electrode active material precursor of claim 1, wherein an aspect ratio of the primary particle is in a range of 3 to 15.

6. The positive electrode active material precursor of claim 1, wherein the aluminum (Al) is contained at a constant concentration in the secondary particle.

7. The positive electrode active material precursor of claim 1, wherein the positive electrode active material precursor is represented by Formula 1:

$$Ni_{x1}Co_{y1}Mn_{z1}Al_{s1}(OH)_2 \qquad \text{[Formula 1]}$$

wherein, in Formula 1, $0.7 \le x1 \le 0.99$, $0 < y1 < 0.3$, $0 < z1 < 0.3$, and $0.01 \le s1 \le 0.1$.

8. A method of preparing the positive electrode active material precursor for a secondary battery of claim 1, the method comprising forming a positive electrode active material precursor by a co-precipitation reaction while adding a transition metal-containing solution containing cations of nickel (Ni), cobalt (Co), and manganese (Mn), an aluminum-containing solution containing cations of aluminum (Al), a basic aqueous solution, and an ammonium solution to a reactor, wherein the aluminum-containing solution comprises sodium aluminate ($NaAlO_2$).

9. The method of claim 8, wherein the sodium aluminate ($NaAlO_2$) is co-precipitated to form $AlO(OH)$.

10. A method of preparing a positive electrode active material for a secondary battery, the method comprising mixing the positive electrode active material precursor of claim 1 with a lithium source and sintering the mixture to form a lithium transition metal oxide.

11. A positive electrode active material for a secondary battery, the positive electrode active material being in a form of a secondary particle in which a plurality of primary particles are aggregated, wherein major axes of the primary particles are arranged in a direction from a center of the secondary particle toward a surface thereof, wherein the primary particle comprises crystallines in which a (003) plane is arranged in a direction having an angle of 20° to 160° with respect to a major axis direction of the primary particle.

12. The positive electrode active material of claim 11, wherein the primary particle comprises crystallines in which the (003) plane is arranged in a direction having an angle of 40° to 140° with respect to the major axis direction of the primary particle.

13. A positive electrode for a secondary battery, the positive electrode comprising the positive electrode active material of claim 12.

14. A lithium secondary battery comprising the positive electrode of claim 13.

* * * * *